: 3,582,350
Patented June 1, 1971

3,582,350
INSTANTLY DISPERSIBLE PREGELATINIZED FLOUR AND STARCH COMPOSITIONS
Sanford Werbin, Dumont, N.J., and David Weinstein, Baltimore, and Irving Rubenstein, Stevenson, Md., assignors to Maryland Cup Corporation, Owings Mill, Md.
No Drawing. Filed Dec. 29, 1967, Ser. No. 694,372
Int. Cl. A23l 1/10, 1/14
U.S. Cl. 99—94
9 Claims

ABSTRACT OF THE DISCLOSURE

An instantly dispersible pregelatinized flour and starch composition having no lumping tendency and which will absorb moisture without the application of heat is prepared by forming an aqeuous slurry of the flour or starch at ambient temperature, admixing a hydrophobic shortening material or a blend thereof with an emulsifier, and subjecting the mixture to a brief heat treatment at a temperature between about 250° and 500° F. The product can be utilized directly for the preparation of instant pudding mixes, pie fillings, ice cream mixes and the like, and can be applied to meat, poultry and fish as a breading mix, followed by final baking or frying.

BACKGROUND OF THE INVENTION

The pregelatinization of starches and of the starch content of flour in order to render these materials more readily capable of utilization in baked goods and various specialty food products has been conventionally employed for many years. Thus, pregelatinized flour is used in the preparation of pastry flour, and pregelatinized starch is employed for instant pudding mixes.

Present techniques for the manufacture of pregelatinized starches involves making an aqueous slurry of the starch followed by running the slurry over a hot roll to obtain a dry product which is comminuted to the desired particle size. This particle size, to a large extent, determines the dispersibility of the pregelatinized starch product. In general, the coarser the particle size, the less difficult is the subsequent dispersion in an aqueous medium. However, the coarse particle does not undergo final gelatinization as rapidly as one of finer mesh size, so that the effort to achieve good dispersibility may be self-defeating.

In the preparation of pregelatinized flour for pastry mixes and the like, the problem of dispersibility of the flour is even more difficult. One known approach is to heat a mixture of water and shortening to boiling, then adding flour until a paste of required consistency is formed, thereafter boiling until the starch content is gelatinized. However, this type of treatment requires relatively large amounts of shortening, so that the problem of lumping when the gelatinized flour is dispersed in water persists.

SUMMARY OF THE INVENTION

With this in mind it is a main object of the present invention to provide a pregelatinized flour or starch composition which can be rapidly dispersed in water.

Another object is to provide such a composition which can be readily dispersed in water with a minimum of agitation and in which the tendency toward lumping is substantially eliminated. These objects and others are accomplished in accordance with preferred embodiments of the invention wherein the dispersible pregelatinized flour (or starch) is a primary product prepared by a novel process including the steps of (a) forming an aqueous slurry of the flour or starch in water at ambient temperature; (b) mixing with the slurry a hydrophobic shortening material or a blend of a shortening material and an emulsifier; and (c) subjecting the mixture to a brief heat treatment at a temperature between about 250° F. and about 500° F.

The flour or starch product which results from this three-step treatment, when dried and comminuted to desired particle size, provides a novel dry, substantially completely dispersible, at least partially gelatinized flour or starch, which will absorb moisture without the application of heat. It forms a primary product which is capable of being utilized as such by a mixture with other suitable ingredients, for the preparation of instant pudding mixes, pie fillings, ice cream mixes, fudge, chocolate and coffee flavorings, and the like.

In accordance with another aspect of the invention, however, the dispersible heat treated pregelatinized flours and starches of the invention constitute partially processed or intermediate products which are suitable for further process, for example, as breading materials for meat, poultry and fish, or in baked goods in wide variety. In such applications, the products of the invention may be admixed with additional ingredients and the mixture subject to further finishing by baking, frying and similar supplemental heat treatments.

The invention thus makes available novel breading mixes which can be applied directly to the wetted meat, poultry or fish, with only the addition of suitable spices or flavorings, followed by baking or frying.

As a flour there may be employed any conventionally used flour, such as, for example, commercial wheat flour, and as a starch any conventionally employed manufactured starches, such as potato starch, tapioca, and the like.

The flour or starch is first made into a slurry with water at ambient temperature, the term ambient as employed herein including temperatures ranging from that of ice water, 32° F., up to about 95° F. The amount of water will advantageously range between about 30% and about 70% by weight of the mixture, about 50% by weight being preferred. It has been found that if ice water is used this lessens the possibility of the material burning during the subsequent heat treatment.

In accordance with one embodiment of the invention, a shortening material, or a mixture of a shortening material and an emulsifier, is added to the flour or starch slurry with or without the presence of leavening. The shortening material may be, for example, lecithin, or a fatty-type material, such as a vegetable oil. Suitable emulsifiers include those commonly employed in food processing, such as glycerol monostearate, Tween 60 (polysorbate 60), sorbitan diglycerides, and the like.

The shortening material is employed in an amount ranging from about 4% to about 8% by weight of the flour or starch, and the emulsifier in an amount ranging from about 0.2% to 1%, but these proportions are not critical. However, far lass shortening is required for the method of the invention than for previously known processes.

Alternatively, the shortening and emulsifier can be admixed with the flour or starch prior to slurry formation, but this is less advantageous, and the addition to the slurry itself is preferred.

By incorporating the hydrophobic materials mentioned in the slurry before the pregelatinizing step is effected, the hydrophobic material is dispersed completely in the aqueous medium. Consequently, upon pregelatinizing by heat or any other conventional means such as spray drying or roll drying, baking in various types of ovens, and the like, there results an extremely intimate mixture of the hydrophobic material with the flour or starch, whereby the heat treated product, even in a very fine particle size, disperses virtually completely. However, if further dispersing agents are desired, such as sugars, salts, gums, dextrins, and the like, which also act as diluents, these may also be added to the flour or starch slurry along with the hydrophobic materials prior to the drying and pregelatinizing steps. Heat stable spices may also be included.

The slurry is then subjected to heat treatment in a suitable apparatus, such as a spray dryer, drum dryer, double plate dryer, or a band oven. The temperature of heat treatment may range from about 250° F. to about 500° F., depending upon the type of flour or starch and the color and degree of gelatinization desired. Thus, for example, for wheat flour, a temperature range of about 325° F. to 425° F. is used. The time of heat treatment, and the temperature itself, will depend upon the color and flow characteristics of the product and the degree of gelatinization desired. Generally a heat treatment time of about 60 seconds to 10 minutes will suffice. However, the time factor will vary inversely with the temperature, and shorter treatment times are feasible with more elevated temperatures than those indicated.

Following the heat treatment, the pregelatinized flour or starch, if dry, or after drying, is preferably comminuted to a particle size of 90% 150 mesh size, or finer.

The product can be used directly as an ingredient in food products which require no further heat treatment. It is also suitable for pastry and cake mixes or for the preparation of batters and doughs to be subjected to baking, or as a breading material to be further heat treated by cooking or frying.

The high degree of dispersibility of, for example, pregelatinized wheat flour prepared in accordance with the invention is shown by the following comparative data:

The dispersibility of finely ground pregelatinized wheat flour prepared in accordance with Example 1 below was compared to commercially available pregelatinized starches, of various origins. These starches were of the same approximate mesh size as the pregelatinized wheat flour, in that they were all about 150 mesh.

In each case, 20 grams of the pregelatinized material was dusted into 400 grams of cold water (66° F.) while the water was being agitated at 60 r.p.m., in a Hobart bowl equipped with a paddle. Agitation was continued at this speed for five minutes. Then, lumps were removed by screening through a 20 mesh sieve. The lumps were washed with alcohol, to remove excess water, dried, and weighed. The results were as follows.

| Pregelatinized material: | Percent |
|---|---|
| Finely ground pregelatinized wheat flour (Example 2) | 0.03 |
| Pregelatinized wheat starch | 4.10 |
| Pregelatinized corn starch | 4.80 |
| Pregelatinized waxy maize starch | 18.92 |
| Pregelatinized tapioca starch | 26.86 |
| Pregelatinized potato starch | 29.62 |

The pregelatinized wheat flour was far superior to the others in dispersion properties. As a matter of fact, the single tiny lump that formed was so small that, for all practical purposes, the pregelatinized wheat flour could be considered completely dispersible.

DESCRIPTION OF THE PREFERRED EMBODIMENTS

The following examples illustrate the practice of the invention, but are not to be regarded as limiting:

EXAMPLE 1

Preparation of pregelatinized wheat flour

An aqueous slurry was prepared using 200 pounds of commercial wheat flour and 100 pounds of water at 60° F. To this slurry there was added a mixture of 12 pounds of a hydrogenated shortening and 6 ounces of lecithin, and the mass was agitated until homogeneous. The slurry was pumped onto a drum dryer and heat treated at 350° F. for 60 seconds. The product was substantially completely dispersible in water.

EXAMPLE 2

The formulation of Example 1 was employed with further inclusion of 26 pounds of sugar, and 26 ounces of baking soda, and water sufficient to make 525 pounds. The heat treated product was suitable for baked goods having a foam structure. The baking soda is an optional ingredient, having as its primary purpose, however, to produce a more friable product having a porous cellular structure.

EXAMPLE 3

The formulation of Example 2 was employed except that 20 pounds of shortening was used and the emulsifier was eliminated altogether.

EXAMPLE 4

The formulation of Example 2 was employed except that instead of the lecithin 1 ounce of polyoxethylene sorbitan stearate was used.

EXAMPLE 5

The formulation of Example 2 was used except that instead of the lecithin 2½ ounces of glycerol monostearate was used.

EXAMPLE 6

Instant pudding

In instant pudding can be prepared by adding to 100 grams of cold homogenized whole milk:

| | Grams |
|---|---|
| Cane sugar | 15.0 |
| Dextrose | 2.2 |
| Salt | 0.2 |
| Anhydrous disodium phosphate | 0.2 |
| Anhydrous tetrasodium pyrophosphate | 0.3 |
| Finely ground pregelatinized wheat flour of Example 2 | 6.0 |

EXAMPLE 7

Instant pudding

| | Percent |
|---|---|
| Cane sugar | 62.7 |
| Finely ground pregelatinized wheat flour of Example 2 | 25.1 |
| Dextrose | 9.1 |
| Anhydrous tetrasodium pyrophosphate | 1.3 |
| Anhydrous disodium phosphate | 0.9 |
| Salt | 0.9 |
| Vanilla flavor and color | To taste |

This is added to one pint of cold milk.

EXAMPLE 8

Lemon pie filling

A good filling, for body and texture qualities was prepared without cooking by using the following formula:

| | Parts by Wt. |
|---|---|
| Cane sugar | 45 |
| Water | 100 |
| Whole egg yolk | 6 |
| Whole lemon juice | 12 |
| Finely ground pregelatinized wheat flour of Example 2 | 14 |

This pie filling was baked at 425° F. for from 25 to 40 minutes, depending upon the size of the pie.

EXAMPLE 9

Breading mix

A typical breading mix formula for fish or chicken with outstanding spreadability can be made as follows:

| | Parts |
|---|---|
| Corn flour | 25 |
| Salt | 10 |
| Nonfat milk powder | 5 |
| Egg yolk solids | 5 |
| Seasoning | 5 |
| Pregelatinized wheat flour of Example 2 | 50 |

A variation of the above formula:

| | Parts |
|---|---|
| Example 2 pregelatinized wheat flour | 75 |
| Salt | 10 |
| Nonfat milk powder | 5 |
| Egg yolk solids | 5 |
| Seasoning | 5 |

EXAMPLE 10

An instant sauce for use as a variegating syrup in ice cream confections was made as follows:

| | Parts |
|---|---|
| Sugar | 40 |
| Corn syrup solids | 20 |
| Pregelatinized wheat flour of Example 2 | 8 |
| Water | 40 |

Flavoring and coloring were added as desired (i.e., strawberry, butterscotch, etc.). An alternate formula for chocolate flavor is as follows:

| | Parts |
|---|---|
| Sugar | 35 |
| Corn syrup solids | 15 |
| Cocoa | 10 |
| Pregelatinized wheat flour of Example 2 | 6 |
| Water | 40 |

EXAMPLE 11

A soft fudge for ice cream centers was made by mixing 9 parts of the sauce of Example 10 with 1 part ice cream mix. This blend was frozen in a conventional ice cream freezer with 40% overrun. The resulting frozen sauce always remained soft even when the ice cream was hard and did not crystallize at ice cream storage temperatures, yet had enough stability not to run as the ice cream started to melt.

EXAMPLE 12

The breading mix of Example 9 was applied to wet chicken legs and thighs, and the parts were baked at 400° F. until a golden brown firm coating was produced.

We claim:

1. Method of preparing a dry, at least partially gelatinized starch-containing food composition consisting essentially of a starch-containing material selected from the group consisting of flour and starch and a hydrophobic shortening material, said composition being substantially completely dispersible in aqueous medium and capable of absorbing moisture without the application of heat, comprising the steps of (a) forming an aqueous slurry of the starch-containing material at ambient temperature with between about 30% and about 70% by weight of said slurry of water; (b) admixing with said slurry from about 4% to about 8% by weight of the starch-containing material of the hydrophobic shortening material; and (c) subjecting the mixture to heat treatment at a temperature between about 250° F. and about 500° F. for a period of time sufficient to partially gelatinize the starch-containing material and to dry the resulting food composition.

2. The method of claim 1 in which the starch-containing material is a flour.

3. The method of claim 1 in which the starch-containing material is a starch.

4. The method of claim 1 in which an emulsifier is further admixed with the starch-containing material.

5. The method of claim 1 in which the slurry temperature is between about 32° F. and about 95° F.

6. The method of claim 1 which includes the further step of applying the heat treated composition to the moistened surface of a meat product prepared for human consumption and heating to form a bread coating thereon.

7. The method of claim 1 further comprising mixing the composition with milk, a flavoring agent, sugar and salt to form an instant pudding.

8. The method of claim 1 wherein a leavening agent is also admixed with said slurry.

9. A dry, at least partially gelatinized starch-containing food composition produced by the process of claim 1.

References Cited

UNITED STATES PATENTS

| | | | |
|---|---|---|---|
| 1,431,938 | 10/1922 | Dunham | 99—94 |
| 2,471,434 | 5/1949 | Kimball et al. | 99—118UX |
| 2,567,815 | 9/1951 | Kipnis | 99—94 |
| 3,135,612 | 6/1964 | Hair et al. | 99—94 |
| 3,445,239 | 5/1969 | Viault | 99—93 |

FOREIGN PATENTS

| | | | |
|---|---|---|---|
| 622,017 | 6/1961 | Canada | 99—118 |

RAYMOND N. JONES, Primary Examiner

J. R. HOFFMAN, Assistant Examiner

U.S. CL. X.R.

99—1, 107, 111, 136, 139